US011989626B2

(12) United States Patent
Arnold et al.

(10) Patent No.: US 11,989,626 B2
(45) Date of Patent: May 21, 2024

(54) GENERATING PERFORMANCE PREDICTIONS WITH UNCERTAINTY INTERVALS

(71) Applicant: INTERNATIONAL BUSINESS MACHINES CORPORATION, Armonk, NY (US)

(72) Inventors: Matthew Richard Arnold, Ridgefield Park, NJ (US); Benjamin Tyler Elder, White Plains, NY (US); Jiri Navratil, Cortlandt Manor, NY (US); Ganesh Venkataraman, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 16/842,295

(22) Filed: Apr. 7, 2020

(65) Prior Publication Data

US 2021/0312323 A1   Oct. 7, 2021

(51) Int. Cl.
*G06N 20/00* (2019.01)
*G06F 11/34* (2006.01)
(Continued)

(52) U.S. Cl.
CPC ......... *G06N 20/00* (2019.01); *G06F 11/3495* (2013.01); *G06F 17/18* (2013.01); *G06N 20/20* (2019.01)

(58) Field of Classification Search
CPC .... G06N 20/00; G06N 20/20; G06F 11/3495; G06F 17/18
See application file for complete search history.

(56) References Cited

U.S. PATENT DOCUMENTS 8,370,280 B1   2/2013   Lin et al.
8,862,491 B2   10/2014  Cope et al.
(Continued)

FOREIGN PATENT DOCUMENTS

CN   102880190 A   1/2013
CN   106919981 A   7/2017
KR   20180046172 A   5/2018

OTHER PUBLICATIONS

Malinin, et al., "Predictive Uncertainty Estimation via Prior Networkis", 32nd Conference on Neural Information Processing Systems (NIPS 2018) (Year: 2018).*
(Continued)

*Primary Examiner* — Tsu-Chang Lee
(74) *Attorney, Agent, or Firm* — Patterson + Sheridan, LLP

(57) ABSTRACT

A technique for generating a performance prediction of a machine learning model with uncertainty intervals includes obtaining a first model configured to perform a task and a production dataset. At least one metric predicting a performance of the first model at performing the task on the production dataset is generated using a second model. The second model is a meta-model associated with the first model. At least one value predicting an uncertainty of the at least one metric predicting the performance of the first model at performing the task on the production dataset is generated using a third model. The third model is a meta-meta-model associated with the second model. An indication of the at least one metric and the at least one value is provided.

25 Claims, 9 Drawing Sheets

(51) Int. Cl.
*G06F 17/18* (2006.01)
*G06N 20/20* (2019.01)

(56) References Cited

U.S. PATENT DOCUMENTS

| | | | |
|---|---|---|---|
| 9,245,067 | B2 | 1/2016 | Subramaniyan et al. |
| 2013/0086431 | A1 | 4/2013 | Arndt et al. |
| 2014/0365191 | A1* | 12/2014 | Zyglowicz ............ G06Q 50/06 703/7 |
| 2019/0102693 | A1 | 4/2019 | Yates et al. |
| 2019/0122073 | A1 | 4/2019 | Ozdemir et al. |
| 2019/0196892 | A1 | 6/2019 | Matei et al. |
| 2019/0325108 | A1 | 10/2019 | Turek et al. |
| 2020/0012962 | A1 | 1/2020 | Dent et al. |

OTHER PUBLICATIONS

Notification of Transmittal of the International Search Report and the Written Opinion of the International Searching Authority, or the Declaration for Application No. PCT/IB2021/051299 dated May 20, 2021.

Lakshminarayanan, et al. "Simple and Scalable Predictive Uncertainty Estimation Using Deep Ensembles", 31st Conference on Neural Information Processing Systems (NIPS 2017), Long Beach, CA, US.

Nix, et al., "Estimating the Mean and Variance of the Target Probability Distribution", Proceedings of 1994 IEEE International Conference on Neural Networks (ICNN'94), Jun. 28-Jul. 2, 1994. (Abstract Only).

Kendall, et al., "What Uncertainties Do We Need in Bayesian Deep Learning for Computer Vision?", 31st Conference on Neural Information Processing Systems (NIPS 2017), Long Beach, California, pp. 1-11 (2017).

Gal, et al., "Dropout as a Bayesian Approximation: Representing Model Uncertainty in Deep Learning", Proceedings of the 33rd International Conference on Machine Learning, New York, NY, 2016. JMLR: W&CP vol. 48, Oct. 4, 2016.

Australian Government, Notice of Acceptance for Australian Application 2021251463 dated Apr. 20, 2023.

* cited by examiner

GENERATING PERFORMANCE PREDICTIONS WITH UNCERTAINTY INTERVALS

BACKGROUND

The present invention generally relates to machine learning, and more specifically, to techniques for generating performance predictions of a machine learning (ML) model with uncertainty intervals.

Recently, ML models have been increasingly employed for a variety of tasks, including, to name a few, image recognition, speech processing, language translation, and object classification. Generally, the ML models that are used for these tasks have become increasingly complex and expensive, in terms of compute resources and time required to train and maintain the models. Further, owing to the dissimilar goals of each task, the models themselves can differ dramatically from each other, such that a model trained for one task or domain is typically unusable for other domains, even if the models are closely related. Because of this possibility, attempts have been made to predict the performance of a model on a set of data for a given task. Performance predictions, however, can suffer from multiple sources of uncertainty, impacting the accuracy of the performance prediction.

SUMMARY

One embodiment presented herein includes a computer-implemented method. The computer-implemented method generally includes obtaining a first model configured to perform a task and a production dataset including unlabeled data. The computer-implemented method also includes generating, using a second model, at least one metric predicting a performance of the first model at performing the task on the production dataset. The second model is a meta-model associated with the first model. The computer-implemented method further includes generating, using one or more third models, at least one value predicting an uncertainty of the at least one metric predicting the performance of the first model at performing the task on the production dataset. Each of the one or more third models is a meta-meta-model associated with the second model. The computer-implemented method further yet includes providing an indication of the at least one metric and the at least one value.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
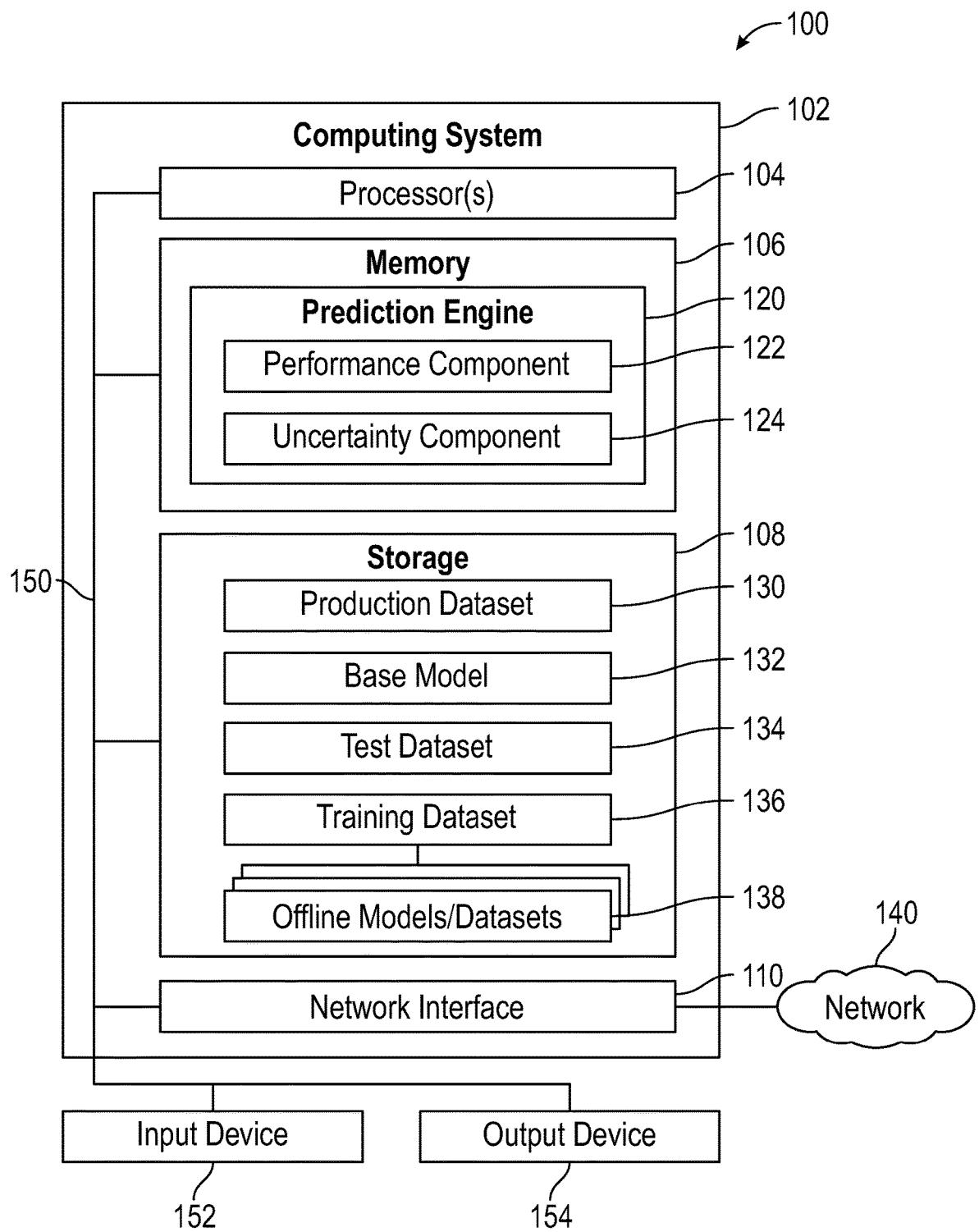
FIG. 1 is a block diagram illustrating a networked system for use in predicting the performance of a model at a task and uncertainty for the performance of the model at the task, according to one embodiment.

ML tools are increasingly used for a variety of tasks, including, but not limited to, regression and classification, optimization, forecasting, etc. In some cases, however, the performance of a given model at a task can change over time. For example, the ability of a model to make accurate predictions may deteriorate over time, depending on how much the underlying data differs from the model's training data. Currently, a number of conventional techniques can be used to predict the performance of a model at a given task. For example, one conventional technique involves detecting the amount of drift in one or more features of the underlying data. Another conventional technique involves tracking the accuracy of the model by measuring the proportion of correct predictions (e.g., the number of times any class was predicted correctly, the area under a receiver operating characteristic (ROC) curve, etc.) over time. These conventional techniques, however, can only be used for performance predictions and do not capture the uncertainty of a model.

Additionally, a number of conventional techniques exist for predicting uncertainty alone (e.g., without considering an underlying performance prediction task). Examples of such techniques include, but are not limited to, confidence intervals and probability (p)-values. Additionally, in Bayesian modeling, there are different types of model uncertainty, including, for example, aleatoric uncertainty and epistemic uncertainty. Aleatoric uncertainty captures inherent uncertainty in data, examples of which can include noise, various data gaps, obfuscations, etc. Epistemic uncertainty captures uncertainty due to the model (e.g., model architecture, model parameters, model assumptions, parameter estimation, insufficient training, etc.).

One issue with the above approaches is that they generally assume that the choice exists over the base model's architecture to enable prediction of the performance of a model and/or the uncertainty of the model. In cases where this choice does not exit, some approaches, such as ensemble techniques, can be used to capture uncertainty, but these approaches assume that the base model is a white box (e.g., a model in which the internal architecture and parameters are visible or known). In many situations, however, where customer-provided models are employed, neither of the above assumptions is acceptable. Accordingly, it may be desirable to provide a technique for generating both a performance prediction of a model and an uncertainty prediction of the model.

Embodiments of the present disclosure provide techniques for predicting the performance of a ML model on an underlying task along with an uncertainty interval for the predicted performance of the ML model. More specifically, given a trained ML model and a set of (unlabeled) production data (which may or may not differ significantly from the model's training data), embodiments can predict the model's performance (e.g., accuracy or other performance or quality related metrics) on the set of production data and an uncertainty interval (e.g., a band around the prediction or error bars) to account for the uncertainty associated with the model at the particular test instance or batch of test instances.

In one embodiment described in more detail below, a stacked meta-modeling approach is employed to generate the performance prediction and the uncertainty prediction. For example, embodiments generate two levels of meta-models: (1) a first level meta-model to predict the performance of a base model and (2) a second level meta-meta-model to predict the uncertainty of the first level meta-model (e.g., regarding its prediction of the performance of the base model). Using a stacked meta-modeling approach enables embodiments to work with models of any architecture (e.g., the stacked meta-modeling approach is agnostic to the model architecture and is not reliant on having access the inner parameters of the model) and capture multiple types of uncertainty (e.g., aleatoric uncertainty, epistemic uncertainty, etc.).

As used herein, a "meta-model" generally refers to a model of a (lower-level) model and a "meta-meta-model" generally refers to a model of a meta-model. A meta-model, for example, captures patterns observed on a lower-level model interacting with data. Note that, in various embodiments of the present disclosure, visual tasks (e.g., processing images for action recognition, object detection, facial recognition, digit or character classification, and the like) are used as examples to explain the functionality of ML models. However, embodiments of the present disclosure are readily applicable to any number of domains, using any input (e.g., visual, audio, textual, and the like). Further, as used herein, the "performance" of a model may refer to one or more accuracy-related metrics of the model on unlabeled data. Similarly, a "performance prediction" may refer to a model-based method of predicting one or more performance or quality related metrics of an underlying base model on unlabeled data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

FIG. 1 is a block diagram illustrating a networked system 100 for use in generating a performance prediction and an uncertainty prediction of a model, according to one embodiment. The system 100 includes a computing system 102. The computing system 102 may also be connected to other computers via a network 140. Network 140 may include one or more networks of various types, including a local area or local area network (LAN), a general wide area network (WAN), a telecommunications or cellular network, and/or a public network (e.g., the Internet).

The computing system 102 generally includes one or more processors 104 connected via a bus 150 to a memory 106, a storage 108, a network interface 110, an input device 152, and an output device 154. The computing system 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor(s) 104 is included to be representative of a single CPU, multiple CPUs, a single CPU having multiple processing cores, and the like.

The memory 106 may include a variety of computer readable media selected for performance or other capabilities: volatile and/or non-volatile media, removable and/or non-removable media, etc. The memory 106 may include a cache, a random access memory (RAM), etc. The storage 108 may be a disk drive or flash storage device. Although shown as a single unit, the storage 108 may be a combination of fixed and/or removable storage devices, such as fixed disc drives, solid state drives, removable memory cards, optical storage, network attached storage (NAS), or a storage area-network (SAN). The network interface 110 may be any type of network communications device allowing the computing system 102 to communicate with other computing systems or devices via the network 140.

The input device 152 provides input to the computing system 102. For example, a keyboard and/or a mouse may be used. The output device 154 may be any device for providing output to a user of the computing system 102. For example, the output device 154 may be any conventional display screen. Although shown separately from the input device 152, the output device 154 and input device 152 may be combined. For example, a display screen with an integrated touch-screen may be used.

Here, the storage 108 includes production dataset 130, a base model 132, test dataset 134, training dataset 136, and offline model(s) and dataset(s) 138. The base model 132 is a model used for solving a particular task (e.g., a customer model for classification of images). In general, any suitable type of model can be used for the base model 132, examples of which include, but are not limited to, artificial neural networks, decision trees, support vector machines, regression analysis, Bayesian network, genetic algorithms, etc. The base model 132 can be a black box model (e.g., a model in which the architecture and/or parameters are unknown) or a white box model (e.g., a model in which the architecture and/or parameters are known).

The base model 132 may be trained/developed on a certain training data set (e.g., training dataset 136) and may be evaluated using a labeled test dataset (e.g., test dataset 134, which includes classification labels). The production dataset 130 is an unlabeled dataset for which no ground truth (e.g., classification labels) is available. The production dataset 130 may be collected from operating conditions after the base model 132 is deployed. The offline model(s) and/or datasets 138 include various models and datasets, some of which may be related to the original task of the base model 132 and some of which may be unrelated to the original task of the base model 132. The offline model(s) and/or datasets 138 are discussed in more detail below with respect to FIGS. 2B and 3.

The memory 106 includes a prediction engine 120, which is configured to implement one or more of the techniques described herein for generating performance predictions and uncertainty intervals for a model. The prediction engine 120 includes a performance component 122 and an uncertainty component 124, each of which can include software, hardware, or combinations thereof. The prediction engine 120 is configured to generate (via the performance component 122) a performance prediction (or predict the performance) of a base ML model 132 and generate (via the uncertainty component 124) an uncertainty interval of the performance prediction, e.g., using a stacked meta-modeling approach. For example, the performance component 122 can use a meta-model (of the base model 132) to predict the performance (e.g., one or more accuracy related metrics) of the base model 132 on the unlabeled production dataset 130. The meta-model may be trained using one or more of the base model 132, the test dataset 134, and the training dataset 136.

Similarly, the uncertainty component 124 can use a meta-meta-model (of the meta-model of the base model 132) to predict the uncertainty of the meta-model of the performance component 122. The meta-meta-model may be trained using one or more of the collection of offline models/datasets 138, meta-model of the performance component 122, base model 132, production dataset 130, test dataset 134, and training dataset 136. In one embodiment, the uncertainty component 124 can generate an uncertainty interval (also known as error bars) that represents the uncertainty of the meta-model. The uncertainty interval delineates a band (or tolerance) around the output of the performance component 122 (e.g., the predicted performance of the base model 132). This band (or tolerance) around the prediction can account for the uncertainty associated with the base model 132 at a particular test instance (e.g., on production dataset 130). The performance component 122 and the uncertainty component 124 are discussed in greater detail below with respect to FIGS. 2A and 2B.

Note FIG. 1 illustrates merely one reference example of a system 100 that can generate a performance prediction along with an uncertainty interval of a model, and that other configurations of the system 100 may be adapted to generate a performance prediction along with an uncertainty interval of a model. For example, in some embodiments, one or more contents (e.g., production dataset 130, base model 132, test dataset 134, training dataset 136, and offline models/datasets 138) of the storage 108 and/or one or more contents (e.g., performance component 122 and uncertainty component 124) may be distributed across one or more computing systems 102 in a network (e.g., a cloud computing environment). In such an embodiment, a first computing system 102 may retrieve one or more of the contents used to generate a performance prediction of a base model 132 from one or more second computing systems 102. Similarly, the first computing system 102 may retrieve one or more of the contents used to generate an uncertainty interval for the predicted performance of the base model 132 from one or more second computing systems 102. In yet other embodiments, the performance prediction and/or the uncertainty interval can be generated by a single computing system 102 or multiple computing systems 102.

Figure 2A:
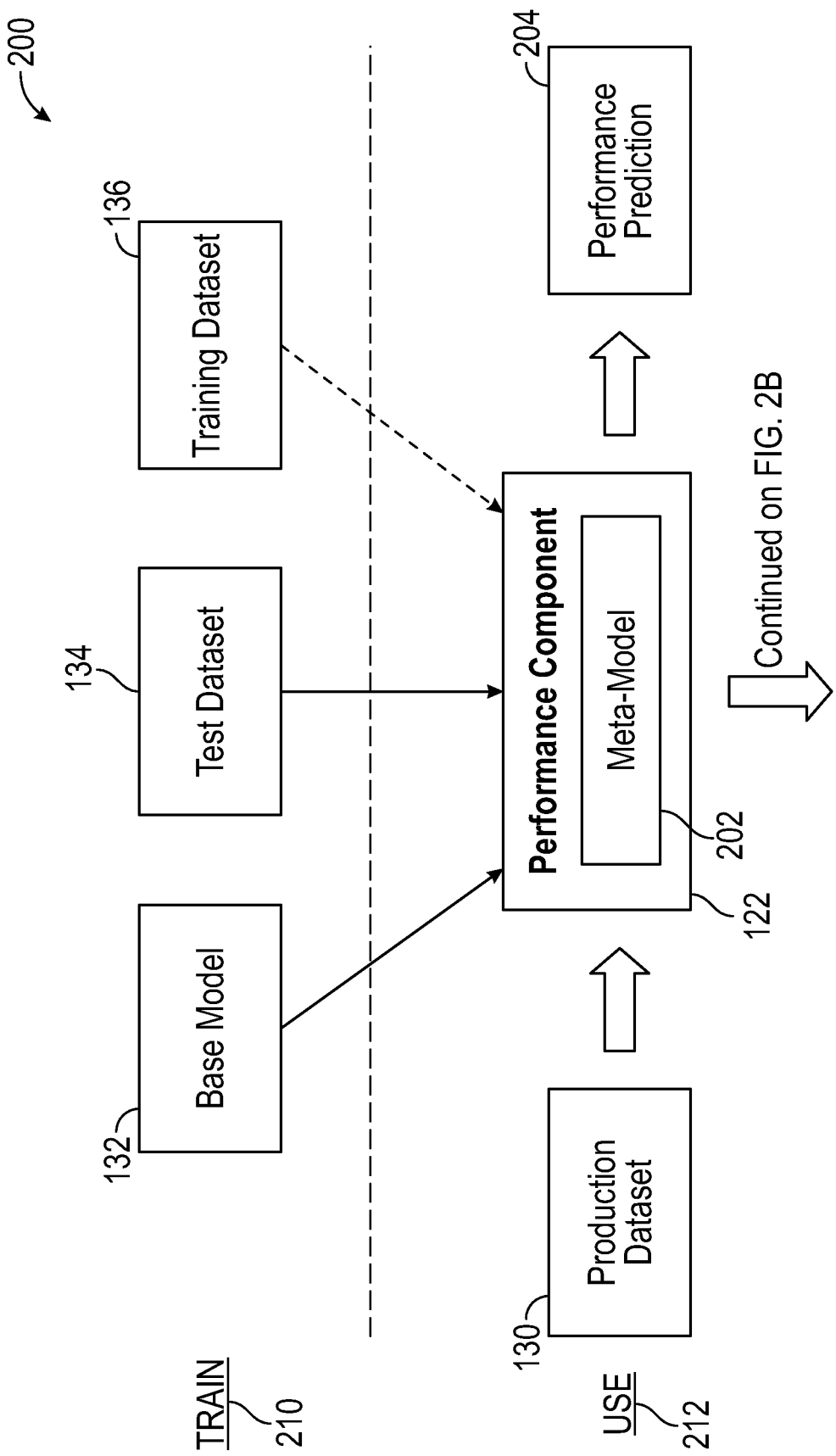
FIGS. 2A and 2B illustrate a stacked meta-modeling workflow for generating a performance prediction of a model and an uncertainty interval for the performance prediction of the model, according to one embodiment.
Figure 2B:
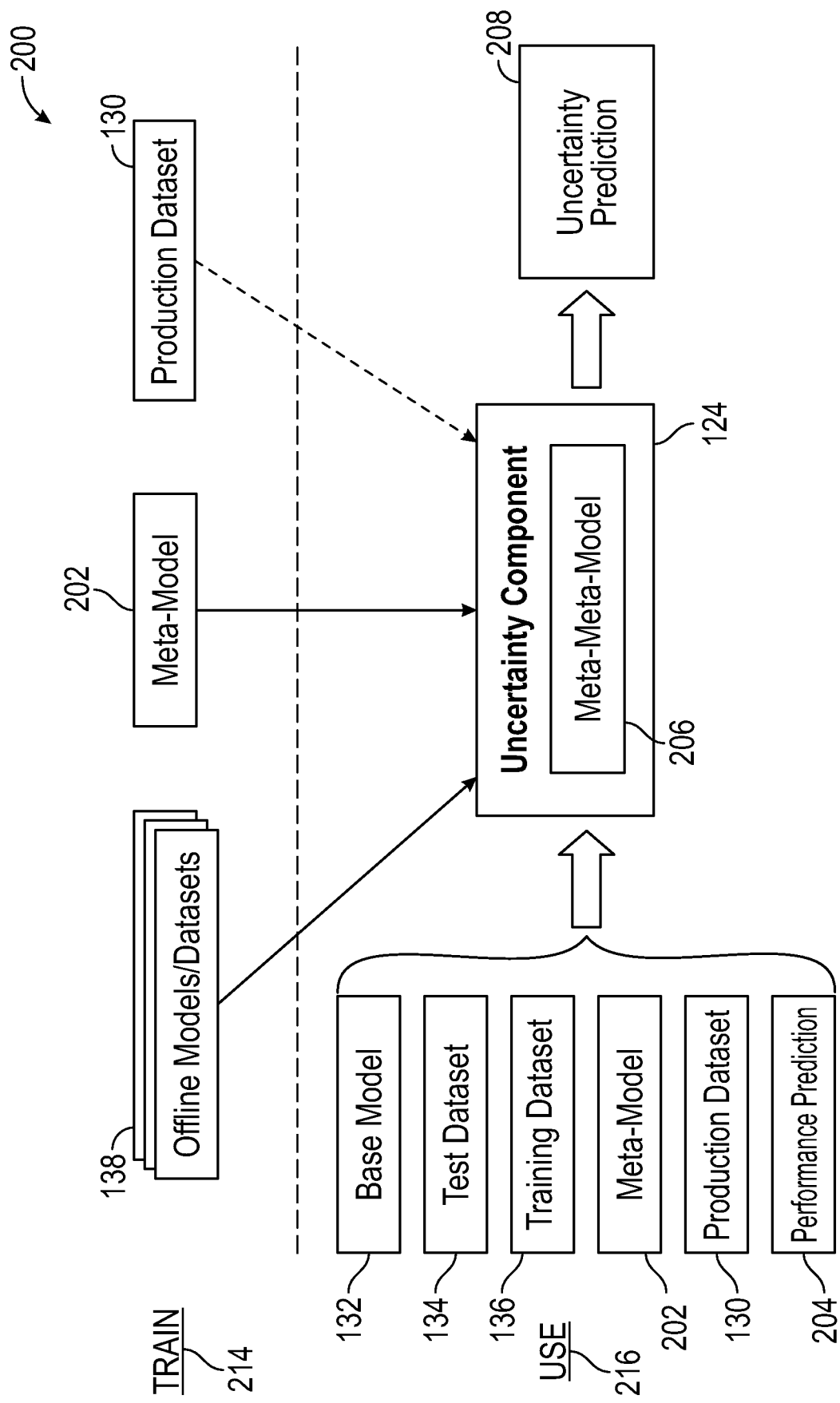

FIGS. 2A-2B illustrate a stacked meta-modeling workflow 200 for generating a performance prediction of a base model (e.g., base model 132) and an uncertainty interval for the performance prediction of the base model, according to one embodiment. Here, the stacked meta-modeling workflow 200 includes a training phase 210 and a use (or deployment) phase 212 (shown in FIG. 2A) and a training phase 214 and a use phase 216 (shown in FIG. 2B).

As shown in FIG. 2A, the performance component 122 includes a meta-model 202, which generally learns to predict the probability of success and failure of the base model 132 on an instance by instance basis. The workflow 200 illustrates a number of different pieces of information that can be considered during the training phase 210. In the depicted embodiment, the base model 132 and (labeled) test dataset 134 are processed and used as inputs to train the meta-model 202. As also shown, in some embodiments, the training dataset 136 can also be used as an additional input to train the meta-model 202.

The training phase 210 depicts a supervised learning approach for training the meta-model 202. The training phase 210 can be performed offline (e.g., when the meta-model 202 is not in use or deployed) or on-line (e.g., when the meta-model 202 is in use or deployed). More generally, however, any suitable machine learning training mechanism can be used, consistent with the functionality described herein. Further note that although the base model 132, test dataset 134, and/or the training dataset 136 are illustrated as going directly into the meta-model 202 during the training phase 210, one of ordinary skill in the art will appreciate that this information can be processed in a variety of ways before any input data is fed into the meta-model 202.

Once the meta-model 202 has been trained, (unlabeled) production dataset 130 (e.g., without classification labels) can be fed into the meta-model 202 as an input and the meta-model 202 can output a performance prediction 204 (e.g., during the use (deployment) phase 212). In some cases, the output prediction scores (e.g., softmax, logits) of the base model 132 and/or the original input features of the base model 132 can also be fed into the meta-model 202 as inputs. Note that although the production dataset 130 is illustrated as going directly into the meta-model 202, one of ordinary skill in the art will appreciate that this information can be processed in a variety of ways before any input data is fed into the meta-model 202.

The performance prediction 204 is a predicted measure of how well (or accurate) the base model 132 will perform at its task (e.g., classifying images) on the (unlabeled) production dataset 130. For example, assuming the base model 132 is a model for object classification, the performance prediction 204 can include a percentage value (e.g., 74%) indicating probability of success/failure of the base model 132 at classifying objects from the production dataset 130. More generally, the performance prediction 204 can include one or more accuracy-related metrics of the base model 132 on the production dataset 130. Examples of such accuracy-related metrics can include, but are not limited to, area under ROC score, true positive rate (TPR), an F1-measure, false positive rate (FPR), R squared score, accuracy score (e.g., percentage of predictions the model got correct), etc.

The performance prediction 204 can be a batch accuracy prediction or a pointwise accuracy prediction. In some cases, the performance prediction 204 can be used for pre-deployment quality checking of the base model 132 (e.g., determining whether the base model 132 should be deployed). In some cases, the performance prediction 204 can be used for quality control/checking (e.g., filtering incorrect predictions, identifying drops in production, etc.) during runtime or deployment of the base model 132. However, as noted above, the performance prediction 204 may suffer from multiple sources of uncertainty (e.g., aleatoric uncertainty, epistemic uncertainty, etc.) that is not captured in the accuracy-related metrics. To address this, embodiments use the uncertainty component 124 to predict an uncertainty interval regarding the performance prediction 204.

As shown in FIG. 2B, the uncertainty component 124 includes a meta-meta-model 206, which learns to predict a function of the error of the meta-model 202 and the actual, observed performance (e.g., absolute value of predicted accuracy minus actual accuracy). The workflow 200 illustrates a number of different pieces of information that can be considered during the training phase 214. In the depicted embodiment, the offline model(s)/dataset(s) 138 and the meta-model 202 are processed and used as inputs to train the meta-meta-model 206. As also shown, in some embodiments, the production dataset 130 can also be used as additional input or sole input to train the meta-meta-model 206.

The training phase 214 depicts a supervised learning approach for training the meta-meta-model 206. The training phase 214 can be performed offline for one or more runs. More generally, however, any suitable machine learning training mechanism can be used, consistent with the functionality described herein. Further note that although the offline models/datasets 138, meta-model 202, and/or production dataset 130 are illustrated as going directly into the meta-meta-model 206, one of ordinary skill in the art will appreciate that this information can be processed in a variety of ways before any input data is fed into the meta-meta-model 206.

The meta-meta-model 206 is configured to learn from one or more offline runs of the training phase 214 when the meta-model 202 is likely to be wrong and by how much. In one embodiment, the meta-meta-model 206 can be trained on a multiple background offline models/datasets 138 (excluding the production dataset 130) to learn general features indicative of expected uncertainty of the meta-model 202. In another embodiment, the meta-meta-model 206 can be trained on the production dataset 130 (e.g., without the offline models/datasets 138). In yet another embodiment, the meta-meta-model 206 can be trained on the offline/models/datasets 138 and the production dataset 130.

The offline models/datasets 138 may include labeled datasets that are related to the task of the base model 132 (e.g., object classification) and/or labeled datasets that are unrelated to the task of the base model 132 (e.g., audio to text conversion). In some embodiments, at least one (first) dataset of the offline models/datasets 138 used to train the meta-meta-model 206 can be dynamically generated from one or more (second) datasets in the offline models/datasets 138. For example, the first dataset(s) can be generated based on resampling one or more features in a second dataset.

Figure 3:
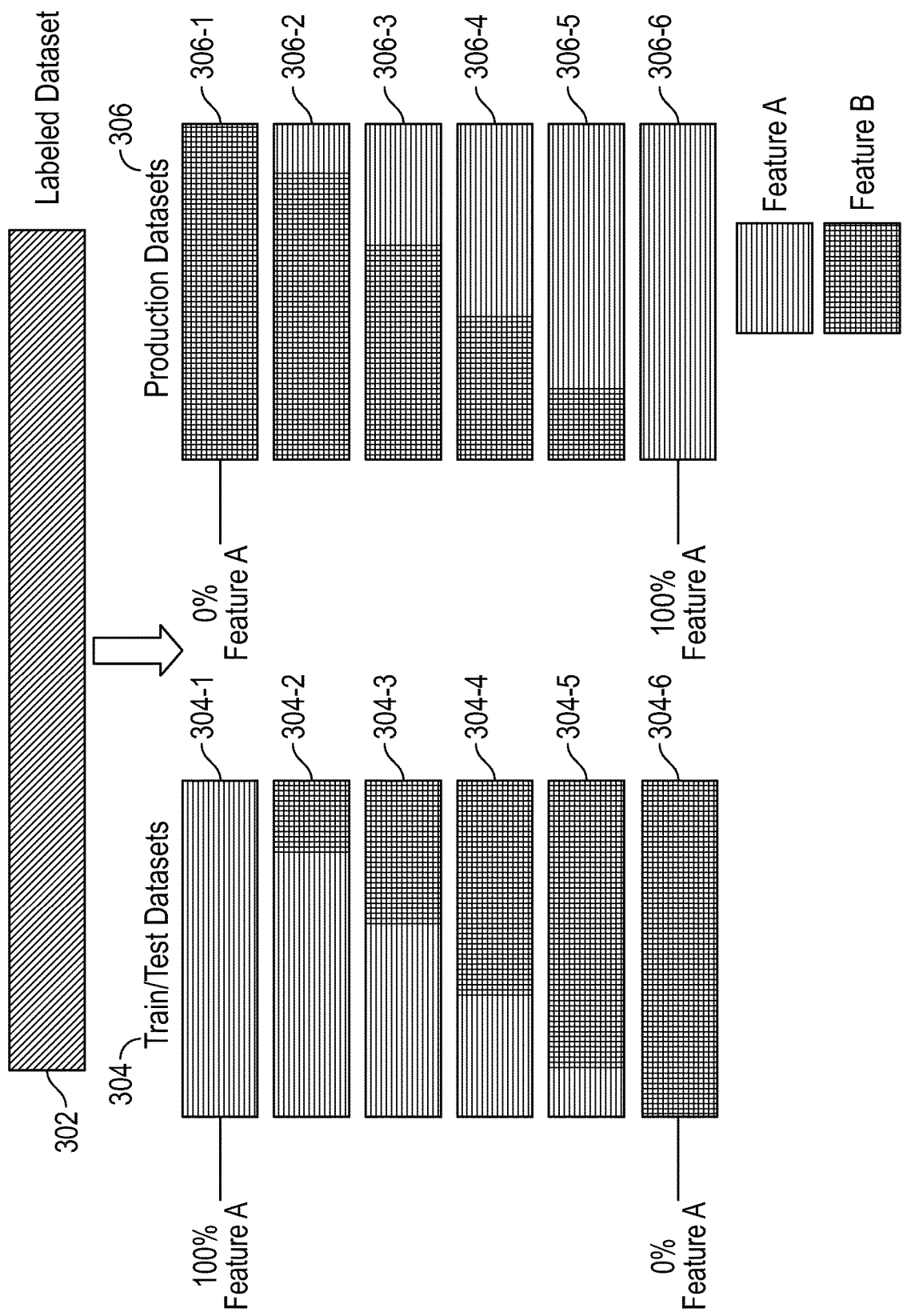
FIG. 3 illustrates an example procedure for generating one or more datasets for training a meta-meta-model, according to one embodiment.

FIG. 3 illustrates an example of generating one or more datasets for training a meta-meta-model 206, according to one embodiment. As shown, given a (base) labeled dataset 302 (which may be one of the offline models/datasets 138), the prediction engine 120 can generate one or more training/test datasets 304-1 to 304-6 and one or more production datasets 306-1 to 306-6 for training the meta-meta-model 206. In one embodiment, the prediction engine 120 can generate the training/test datasets 304 and the production datasets 306 by resampling the (base) labeled dataset 302 based on one or more features of the labeled dataset 302.

In one example, the training/test datasets 304 and the production datasets 306 can be generated by resampling the (base) labeled dataset 302 based on various features to introduce a covariate shift. In this example, the particular feature(s) of the (based) labeled dataset 302 that are used to resample the distributions of the training/test datasets 304 and production datasets 306 can be dynamically selected by the prediction engine 120 (e.g., based on feature importance). In another example, the training/test datasets 304 and the production datasets 306 can be generated by resampling the (base) labeled dataset 302 based on an actual class label to introduce a prior probability shift.

As shown in FIG. 3, assuming the feature is "Feature A" (e.g., "Dog") (or "Feature B", such as "Cat"), the ratio of "Feature A" (or "Feature B") can be varied in each of the training/test datasets 304-1 to 304-6 and production datasets 306-1 to 306-6 (e.g., by resampling the features in the labeled dataset 302). Here, for example, training/test dataset 304-1 includes a statistical distribution of 100% of "Feature A" (or 0% of "Feature B") and corresponding production dataset 306-1 includes a statistical distribution of 0% of "Feature A" (or 100% of "Feature B"). Similarly, on the opposite end, training/test dataset 304-6 includes a statistical distribution of 0% of "Feature A" (or 100% of "Feature B") and corresponding production dataset 306-6 includes a statistical distribution of 100% of "Feature A" (or 0% of "Feature B").

Referring back to FIG. 2B, in some embodiments, training the meta-meta-model 206 (e.g., during the training phase 214) may involve generating one or more features based on metadata about the input datasets (e.g., offline models/datasets 138, which can include training/test datasets 304, production datasets 306, etc.) and/or other distributional feature space properties of the input datasets. In one embodiment, one or more features can be based on the base model 132 and offline models/datasets 138 (including training and production datasets). For example, the prediction engine 120 may compute various distributions in a test dataset and a production dataset and compare distances between the various distributions in order to create one or more features used to train the meta-meta-model 206.

Figure 4:
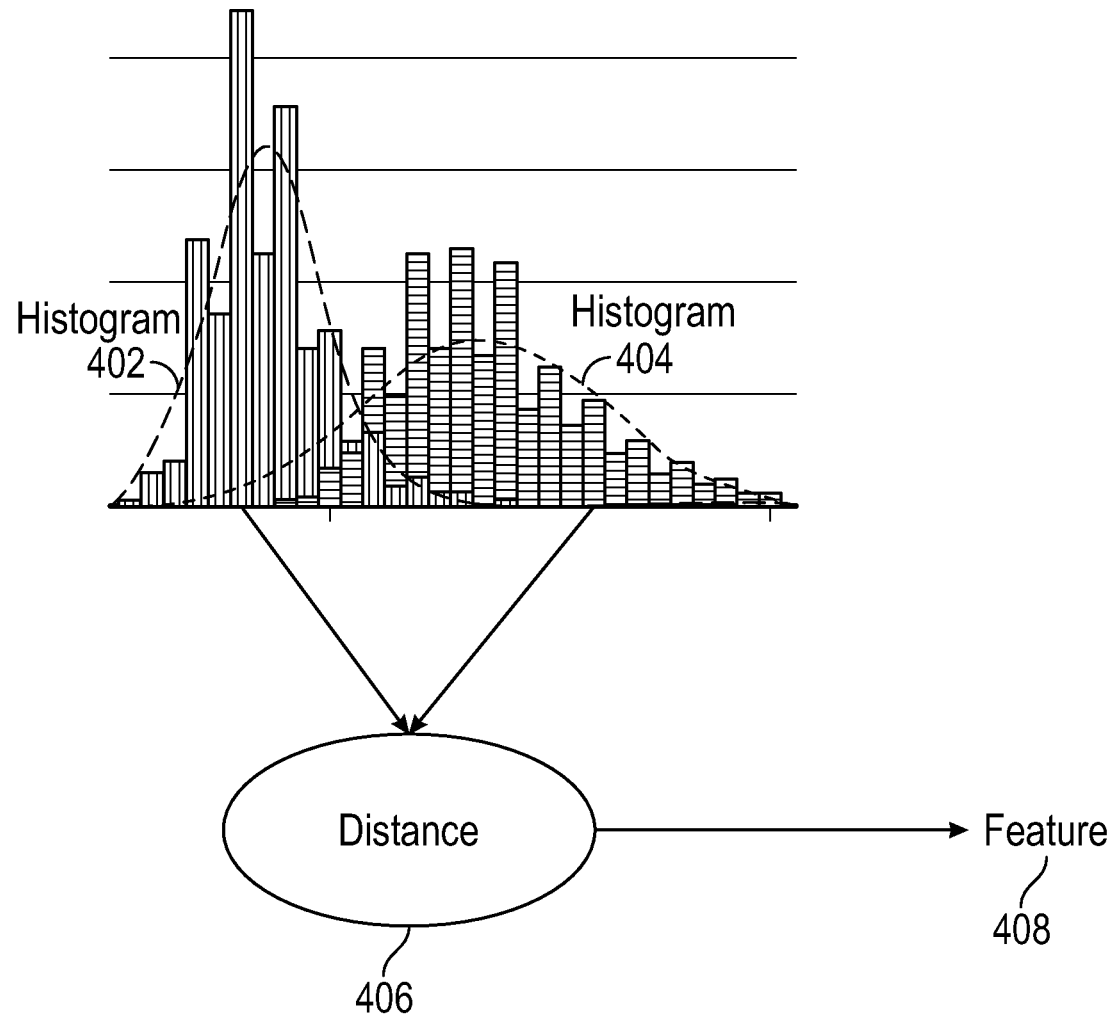
FIG. 4 illustrates an example of generating a feature for training a meta-meta-model, according to one embodiment.

As shown in FIG. 4, for example, a first distribution (histogram 402) can be computed based on a test dataset (e.g., test dataset 304) and a second distribution (histogram 404) can be computed based on a production dataset (e.g., production dataset 306). The distance 406 (or, more generally, the divergence) between the distributions can be computed and used as a feature (also referred to as a feature value) 408. Generating feature(s) 408 to train the meta-meta-model 206 in this manner may account for performance predictions that are significantly noisy (e.g., above a threshold), scenarios where the average output from the meta-model 202 is stable, but the variances are high (e.g., above a threshold), scenarios where the sample-wise uncertainty is too large for batch-wise error bars, etc.

In one embodiment, one example feature 408 may be based on a top confidence score(s) from the base model 132. For example, the base model 132 can be used to score samples in the test dataset and the production dataset. Assuming the base model 132 is used for object classification (e.g., between class A and class B), output prediction scores using the base model 132 can be obtained for each sample (or data point) in the test dataset and each sample (or data point) in the production dataset. As an example, for a first sample in the test dataset, the base model 132 may output 95% class A and, for a first sample in the production dataset, the base model 132 may output 90% class A.

After all samples in each of the test dataset and the production dataset have been scored, a subset of the scored samples in both the test dataset and the production dataset can be used to build histograms. For example, a (first) histogram of the highest confidence scores (e.g., between certain threshold ranges, such as between 90-95%, 95-98%, 98-100%, etc.) from the scored samples in the test dataset can be generated. Likewise, a (second) histogram of the highest confidence scores (e.g., between certain threshold ranges) from the scored samples in the production dataset can be generated. The two histograms can then be compared with a divergence function (e.g., similarity metric, difference metric). In one embodiment, the distance 406 (e.g., Hellinger distance) between the two histograms can be computed and the value of the distance 406 (e.g., in [0, 1]) can be used as a feature 408 for the meta-meta-model 206.

In one embodiment, one example feature 408 can be based on a shadow model top confidence score. Compared to the base model top confidence score, in this embodiment, another (proxy) model is trained on the same training dataset (e.g., training dataset 136) used to train the base model 132. The top confidence scores from the test dataset and the production dataset are then computed using the proxy model (e.g., as opposed to the base model 132). Histograms can be generated based on the top confidence scores, and the distance between the histograms can be used as a feature 408 for the meta-meta-model 206.

In one embodiment, one example feature 408 can be based on a class frequency distance. In this embodiment, for example, histograms of the percentage of samples in the test dataset and production dataset predicted by the base model 132 to be in each class can be generated. The distance 406 (e.g., Hellinger distance) between the histograms can be computed and the distance value can be used as a feature 408 for the meta-meta-model 206.

In one embodiment, one example feature 408 can be based on a top feature distance. In this embodiment, for example, a shadow random forest model can be trained and use to identify the data feature with the highest feature importance (e.g., satisfying a predefined condition). Once identified, histograms of the test dataset and the production dataset can be projected onto this dimension (e.g., a compressed one dimensional feature space). The distance 406 (e.g., Hellinger distance) between the histograms can be computed and the distance value can be used as a feature 408 for the meta-meta-model 206.

In one embodiment, one example feature 408 can be based on the meta-model prediction (e.g., performance prediction 204). In this embodiment, the change in base model accuracy between the test dataset and the production dataset as predicted by the meta-model 202 can be used as a feature 408 for the meta-meta-model 206. In one embodiment, one example feature 408 can be based on a statistical hypothesis test between a first statistical distribution (of a first dataset) and a second statistical distribution (of a second dataset).

Note that the above features are provided merely as reference examples of features that can be used to train a meta-meta-model 206 that that other features or any combination of features based on the meta-data of the input datasets can be used, consistent with the functionality described herein. In some embodiments, for example, multiple meta-meta-models can be generated/trained based on different features. In these embodiments, the particular meta-meta-model used during the run phase 216 can be dynamically selected at runtime, based on characteristics of the data (e.g., metadata about the dataset, number of features, distributional feature space properties, etc.).

Once the meta-meta-model 206 has been trained, one or more of the base model 132, test dataset 134, training dataset 136, meta-model 202, production dataset 130, and performance prediction 204 can be fed into the meta-meta-model 206 as an input and the meta-meta-model 206 can output an uncertainty prediction 208 (e.g., during the use (deployment) phase 216). The uncertainty prediction 208 is a predicted measure of the uncertainty of the performance prediction 204 output from the meta-model 202. For example, assuming the base model 132 is a model for object classification, the uncertainty prediction 208 can indicate an interval (or tolerance) (e.g., ±4, ±7, ±2) that represents the amount of uncertainty of the performance prediction 204. In some embodiments, the uncertainty prediction 208 can be used for additional pre-deployment quality checking of the base model 132 and/or for quality control/checking during runtime or deployment of the base model 132.

Figure 5:
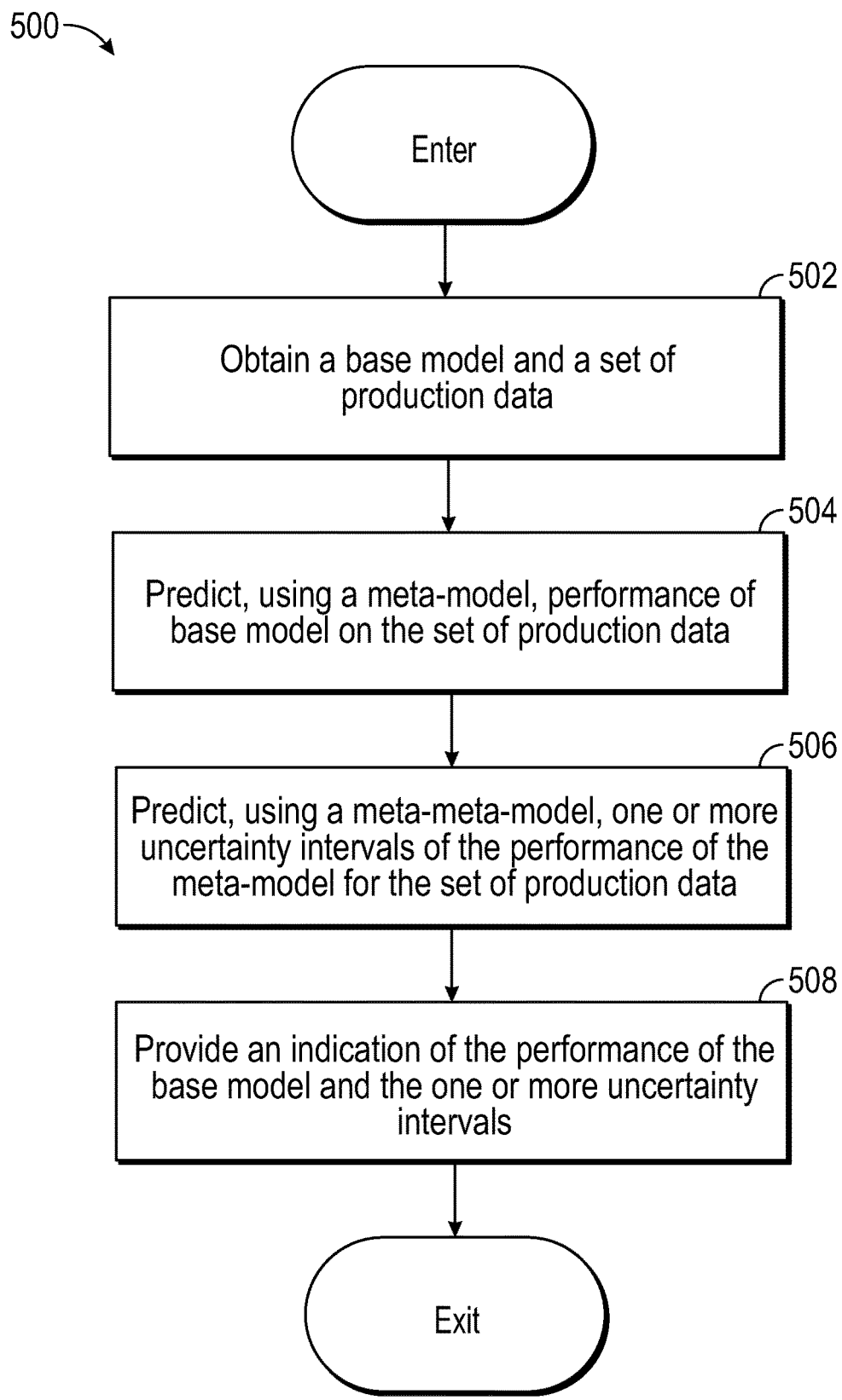
FIG. 5 is a flowchart of a method for predicting the performance of a model at a task and uncertainty for the performance of the model at the task, according to one embodiment.

FIG. 5 is a flowchart of a method 500 for predicting the performance of a model at a task and uncertainty for the performance of the model at the task, according to one embodiment. The method 500 may be performed by prediction engine of a computing system (e.g., prediction engine 120 of computing system 102).

Method 500 may enter at block 502, where the prediction engine obtains a base model (e.g., base model 132) and a set of production data (e.g., production dataset 130). At block 504, the prediction engine predicts, using a meta-model (e.g., meta-model 202), performance (e.g., performance prediction 204) of the base model on the set of production data. For example, the prediction engine may generate one or more accuracy-related metrics of the base model on the set of production data. In one particular example, the accuracy-related metric may indicate a probability of success/failure (e.g., X % successful) of the base model at its task using the set of production data.

At block 506, the prediction engine predicts, using a meta-meta-model (e.g., meta-meta-model 206), one or more uncertainty intervals (e.g., uncertainty prediction 208) of the performance of the meta-model for the set of production data. For example, the prediction engine can generate a tolerance (or error band) (e.g., ±Y) indicating the amount of uncertainty of the predicted performance of the base model at its task using the set of production data.

In one embodiment, the uncertainty interval(s) (predicted at block 506) may be asymmetric. For example, the prediction engine can predict the signed value (e.g., + or −) of the error representing the uncertainty of the predicted performance. In another example, a first uncertainty interval can be generated for an upper band/range around the predicted performance and a second uncertainty interval can be generated for a lower band/range around the predicted performance.

In some embodiments, multiple meta-meta-models can be used to generate the multiple uncertainty intervals (e.g., a first meta-meta-model for the first (upper) uncertainty interval and a second meta-meta-model for the second (lower) uncertainty interval). In some embodiments, the multiple uncertainty intervals can be generated with a single meta-meta-model. For example, the single meta-meta-model can include two submodules (or components) for predicting the upper and lower uncertainty intervals.

At block 508, the prediction engine provides an indication of the performance of the base model and the one or more uncertainty intervals. In one embodiment, the prediction engine can provide the indication on a user interface of a display of a computing device (e.g., computing system 102). In one embodiment, the prediction engine may provide the indication in response to a request for the performance prediction and uncertainty prediction of a base model for a set of production data. For example, a user may use the prediction engine to determine which base model (of multiple base models) to use on the set of production data. In another example, the prediction engine may monitor deployment/runtime of the base model and continually provide the indication (e.g., at one or more predefined time intervals) to a computing device. This indication can then be used to determine when the base model should be refined and/or replaced. In some cases, the prediction engine may run the meta-meta-model at the same frequency as the meta-model.

Figure 6:
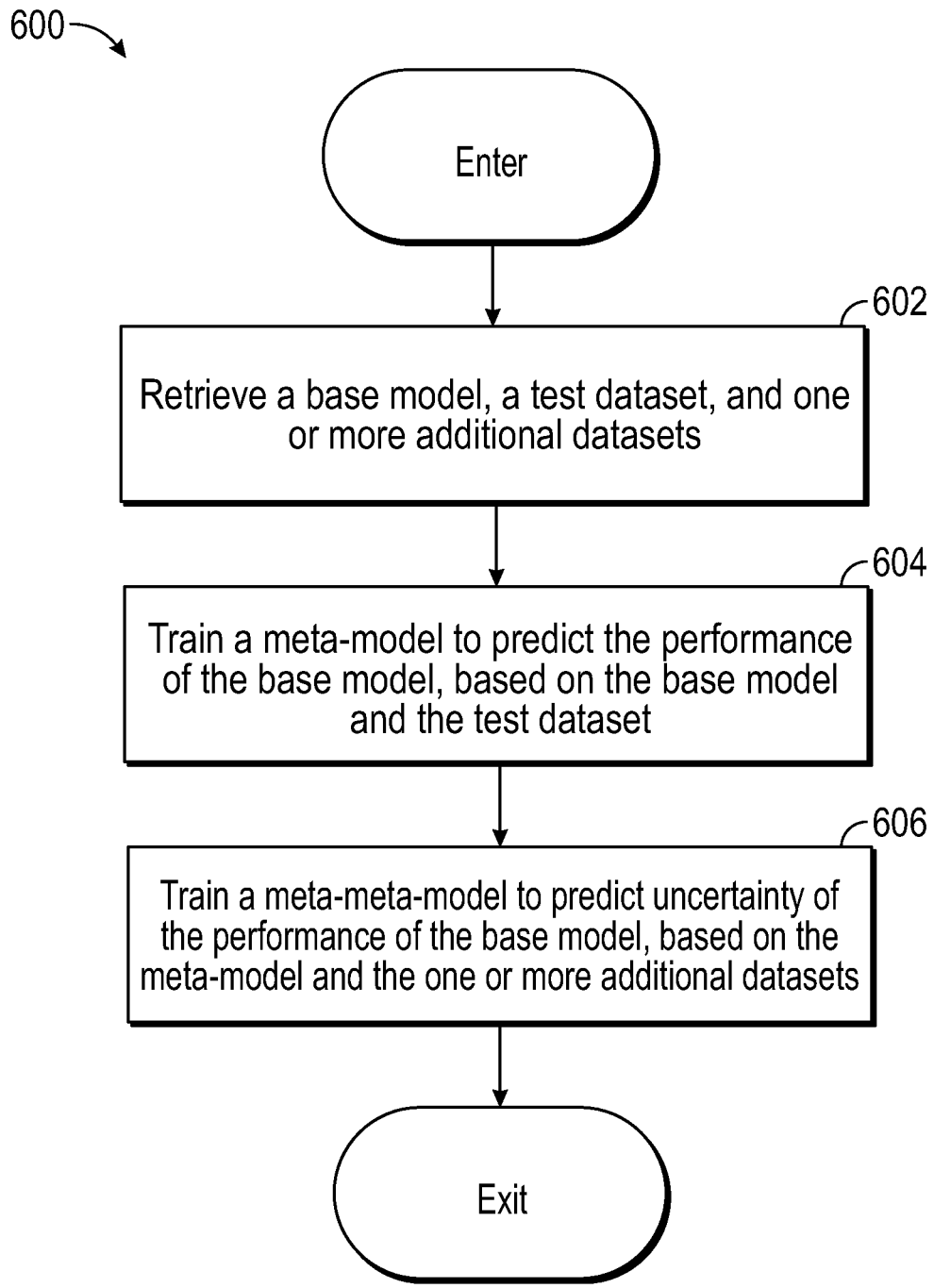
FIG. 6 is a flowchart of a method for training a meta-model and a meta-meta-model of a stacked meta-model workflow for generating a performance prediction of a model and an uncertainty interval for the performance prediction of the model, according to one embodiment.

FIG. 6 is a flowchart of a method 600 for training a meta-model and a meta-meta-model of a stacked meta-model workflow for generating a performance prediction of a model and an uncertainty interval for the performance prediction of the model, according to one embodiment. The method 600 may be performed by prediction engine of a computing system (e.g., prediction engine 120 of computing system 102).

Method 600 may enter at block 602, where the prediction engine retrieves a base model (e.g., base model 132), a test dataset (e.g., test dataset 134), and one or more additional datasets (e.g., offline models/datasets 138). At block 604, the prediction engine trains a meta-model (e.g., meta-model 202) to predict the performance of the base model at a task, based on the base model and the test dataset. At block 606, the prediction engine trains a meta-meta-model to predict an uncertainty of the performance of the base model at its task, based on the meta-model and the one or more additional datasets.

Figure 7:
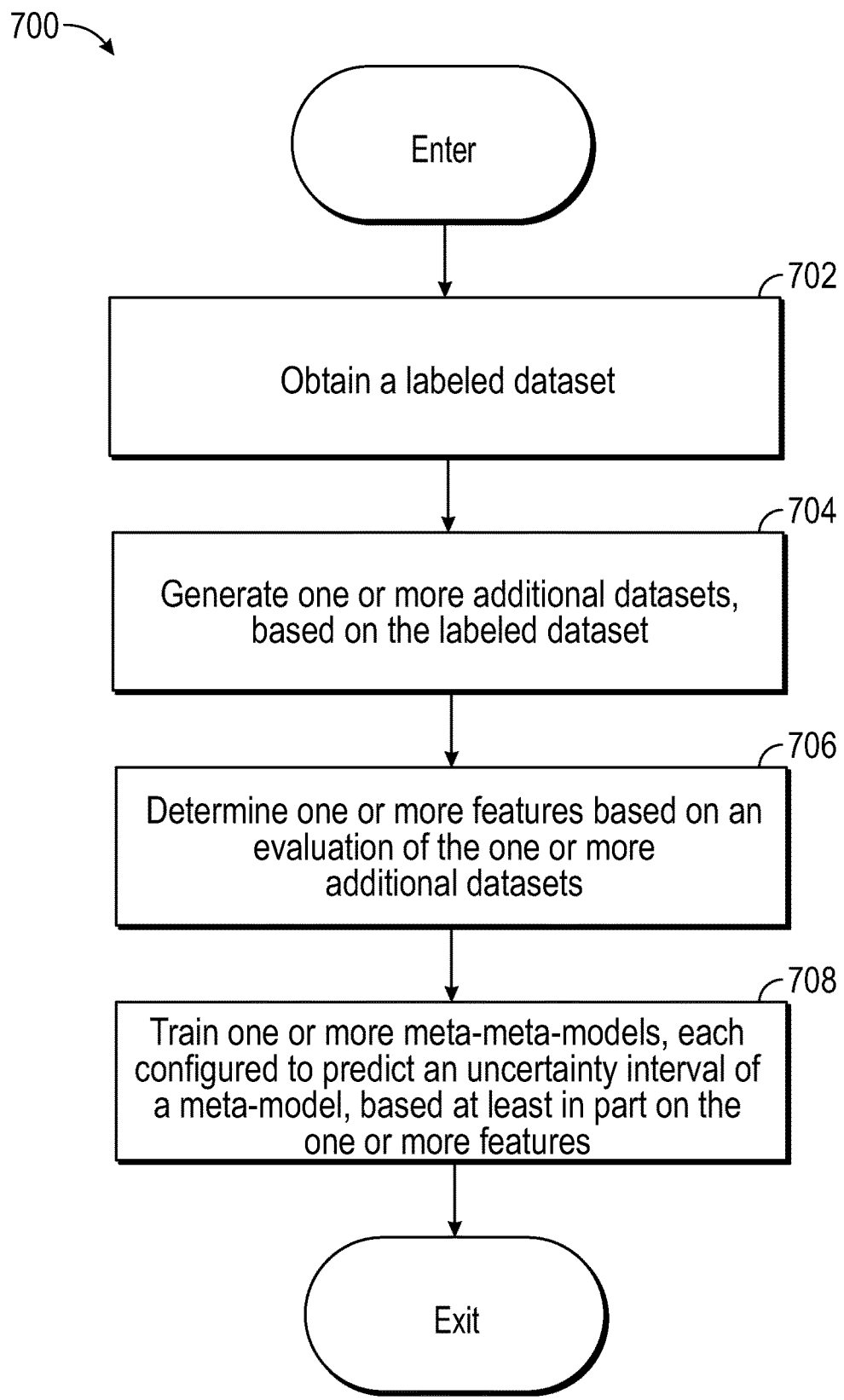
FIG. 7 is a flowchart of a method for training a meta-meta-model, according to one embodiment.

FIG. 7 is a flowchart of a method 700 for training a meta-meta-model, according to one embodiment. The method 700 may be performed by prediction engine of a computing system (e.g., prediction engine 120 of computing system 102).

Method 700 may enter at block 702, where the prediction engine obtains a labeled dataset (e.g., labeled dataset 302). At block 704, the prediction engine generates one or more additional datasets (e.g., training/test datasets 304, production datasets 306), based on the labeled dataset. At block 706, the prediction engine determines (or computes) one or more features (e.g., features 408) based on an evaluation of the one or more additional datasets. At block 708, the prediction engine trains one or more meta-meta-models (e.g., meta-meta-model 206), each configured to predict an uncertainty interval of a meta-model (e.g., meta-model 202) based at least in part on the one or more features.

Figure 8:
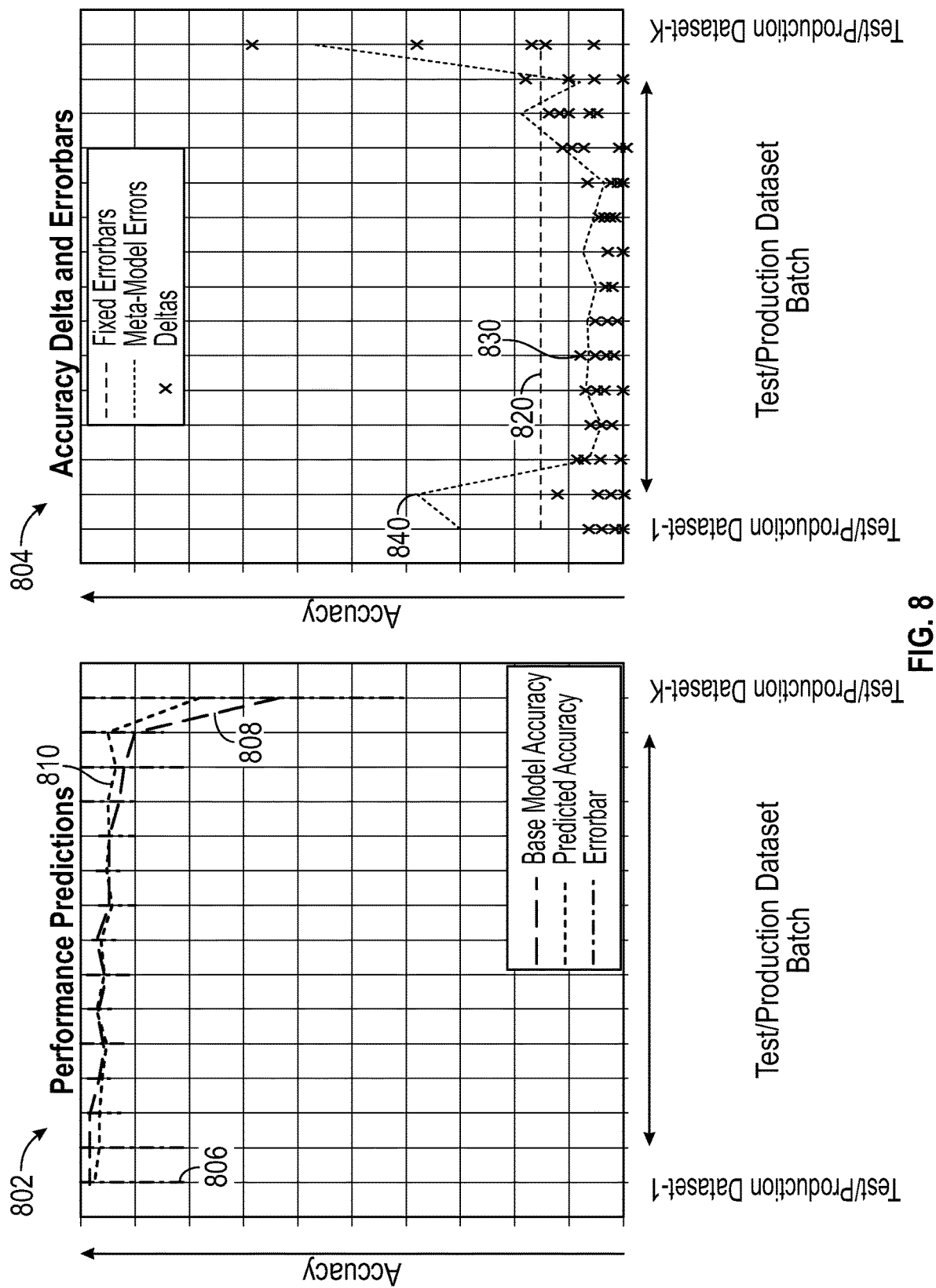
FIG. 8 illustrates example simulations of performance predictions and uncertainty intervals, according to one embodiment.

FIG. 8 illustrates example simulations 802 and 804 of performance predictions of a base model and uncertainty intervals for the performance predictions, according to one embodiment.

More specifically, simulation 802 depicts the performance predictions of a base model across different test/production datasets 1-K. As shown, the base model accuracy (e.g. actual accuracy of the base model) is represented with line 808, the predicted accuracy of the base model is represented with line 808, and the error bars for the predicted accuracy are represented by 806. Each test/production dataset 1-K may have a different statistical distribution of features/labels. For example, test/production dataset 1 may include a statistical distribution of 100% "Feature A" in the test dataset and 0% "Feature A" in the production dataset. Likewise, on the opposite end, test/production dataset K may include a statistical distribution of 0% "Feature A" in the test dataset and 100% "Feature A" in the production dataset.

Simulation 804, which corresponds to simulation 802, shows the meta-model error (represented by 840), a fixed error bar (or uncertainty value) 820, and the deltas 830 between the meta-model error and actual base model output. As shown, by using the stacked meta-model workflow to generate uncertainty intervals for the performance prediction of the model, embodiments can generate more accurate uncertainty intervals, compared to using a fixed uncertainty value 820.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In the context of the present invention, a user may access applications (e.g., prediction engine 120) or related data (e.g., base model 132, test dataset 134, training dataset 36, offline models/datasets 138, production dataset 130, etc.) available in the cloud. For example, the prediction engine 120 could execute on a computing system in the cloud and predict the performance of a base model along with an uncertainty interval for the predicted performance of the base model. In such a case, the application could retrieve one or more of the input information used to generate the performance prediction and/or uncertainty prediction from a storage location in the cloud and store the performance prediction and/or the uncertainty prediction at a storage location in the cloud.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
obtaining a first machine learning model configured to perform a task and a first dataset comprising unlabeled data;
training a second machine learning model to predict a performance of the first machine learning model at performing the task on the first dataset, based at least in part on the first machine learning model and a second dataset comprising labeled data, wherein the second machine learning model is a meta-model associated with the first machine learning model;
after the first machine learning model has been deployed to perform the task, generating, using the second machine learning model, at least one metric predicting the performance of the first machine learning model at performing the task on the production first dataset;
generating, for each third machine learning model of a plurality of third machine learning models, a respective set of features for training the third machine learning model based on an evaluation of one or more third datasets, wherein each of the plurality of third machine learning models is a respective meta-meta-model associated with the second machine learning model and is configured to predict one or more uncertainties of the at least one metric predicting the performance of the first machine learning model at performing the task on the first dataset;
training each third machine learning model of the plurality of third machine learning models, based on the respective set of features corresponding to the third machine learning model;
dynamically selecting one of the plurality of third machine learning models, based on an evaluation of the first dataset, the one or more third datasets, and the sets of features;
after the first machine learning model has been deployed to perform the task, generating, using the selected one of the plurality of third machine learning models, at least one value predicting the one or more uncertainties of the at least one metric predicting the performance of the first machine learning model at performing the task on the first dataset; and
providing an indication of the at least one metric and the at least one value.

2. The computer-implemented method of claim 1, wherein the first machine learning model is a black-box machine learning model.

3. The computer-implemented method of claim 1, wherein the first machine learning model is a white-box machine learning model.

4. The computer-implemented method of claim 1, wherein at least one of the plurality of third machine learning models is further trained on (i) a training dataset for the first machine learning model and (ii) the second machine learning model.

5. The computer-implemented method of claim 1, wherein at least one of the plurality of third machine learning models is further trained on (i) a training dataset for the first machine learning model, (ii) the one or more third datasets, and (iii) the second machine learning model.

6. The computer-implemented method of claim 1, wherein at least one of the plurality of third machine learning models is further trained on (i) the one or more third datasets and (ii) the second machine learning model.

7. The computer-implemented method of claim 6, wherein the at least one of the plurality of third machine learning models is trained offline on the one or more third datasets and the second machine learning model.

8. The computer-implemented method of claim 6, wherein:
the one or more third datasets comprises at least one dataset that includes a first set of labels for classifying data in the at least one dataset; and
the first set of labels are different from a second set of labels for classifying data in a dataset used to train the second machine learning model.

9. The computer-implemented method of claim 6, wherein the one or more third datasets comprises at least one labeled dataset, the computer-implemented method further comprising:
generating a plurality of testing datasets and a plurality of production datasets, based on the labeled dataset; and
including the plurality of testing datasets and the plurality of production datasets in the one or more third datasets.

10. The computer-implemented method of claim 9, wherein generating the plurality of testing datasets and the plurality of production datasets comprises resampling one or more features of the labeled dataset, such that each testing dataset and corresponding production dataset includes a different proportion of the one or more features relative to the labeled dataset.

11. The computer-implemented method of claim 6, wherein at least one feature of at least one of the plurality of third machine learning models is generated based at least in part on a first statistical distribution of a first dataset in the one or more third datasets and a second statistical distribution of a second dataset in the one or more third datasets.

12. The computer-implemented method of claim 11, wherein the at least one feature of the at least one of the plurality of third machine learning models is further generated based on a divergence function between the first statistical distribution and the second statistical distribution.

13. The computer-implemented method of claim 11, wherein the at least one feature of the at least one of the plurality of third machine learning models is further generated based on a statistical hypothesis test between the first statistical distribution and the second statistical distribution.

14. The computer-implemented method of claim 1, wherein the at least one value predicting the one or more uncertainties of the at least one metric comprises an interval range.

15. The computer-implemented method of claim 14, wherein the interval range is an assymetric interval range comprising a first upper range and a second lower range.

16. The computer-implemented method of claim 15, wherein the first upper range and the second lower range are generated via one of the plurality of third machine learning models.

17. The computer-implemented method of claim 15, wherein:
the first upper range is generated via a first of the plurality of third machine learning models; and
the second lower range is generated via a second of the plurality of third machine learning models.

18. The computer-implemented method of claim 15, wherein:
the first upper range is generated via a first component of one of the plurality of third machine learning models; and
the second lower range is generated via a second component of the one of the plurality of third machine learning models.

19. A system comprising:
one or more memories collecting storing instructions; and
one or more computer processors coupled to the one or more memories, the one or more computer processors being collectively configured to execute the instructions to cause the system to perform an operation comprising:
obtaining a first machine learning model configured to perform a task and a first dataset comprising unlabeled data;
training a second machine learning model to predict a performance of the first machine learning model at performing the task on the first dataset, based at least in part on the first machine learning model and a second dataset comprising labeled data, wherein the second machine learning model is a meta-model associated with the first machine learning model;
after the first machine learning model has been deployed to perform the task, generating, using the second machine learning model, at least one metric predicting the performance of the first machine learning model at performing the task on the first dataset;
generating, for each third machine learning model of a plurality of third machine learning models, a respective set of features for training the third machine learning model based on an evaluation of one or more third datasets, wherein each of the plurality of third machine learning models is a respective meta-meta-model associated with the second machine learning model and is configured to predict one or more uncertainties of the at least one metric predicting the performance of the first machine learning model at performing the task on the first dataset;
training each third machine learning model of the plurality of third machine learning models, based on the respective set of features corresponding to the third machine learning model;
dynamically selecting one of the plurality of third machine learning models, based on an evaluation of the first dataset, the one or more third datasets, and the sets of features;
after the first machine learning model has been deployed to perform the task, generating, using the selected one of the plurality of third machine learning models, at least one value predicting the one or more uncertainties of the at least one metric predicting the performance of the first machine learning model at performing the task on the first dataset; and
providing an indication of the at least one metric and the at least one value.

20. A computer-readable storage medium having computer-readable program code embodied therewith, the computer-readable program code executable by one or more computer processors to perform an operation comprising:
obtaining a first machine learning model configured to perform a task and a first dataset comprising unlabeled data;
training a second machine learning model to predict a performance of the first machine learning model at performing the task on the first dataset, based at least in part on the first machine learning model and a second dataset comprising labeled data, wherein the second machine learning model is a meta-model associated with the first machine learning model;
after the first machine learning model has been deployed to perform the task, generating, using the second machine learning model, at least one metric predicting the performance of the first machine learning model at performing the task on the first dataset;
generating, for each third machine learning model of a plurality of third machine learning models, a respective set of features for training the third machine learning model based on an evaluation of one or more third datasets, wherein each of the plurality of third machine learning models is a respective meta-meta-model associated with the second machine learning model and is configured to predict an one or more uncertainties of the at least one metric predicting the performance of the first machine learning model at performing the task on the first dataset;
training each third machine learning model of the plurality of third machine learning models, based on the respective set of features corresponding to the third machine learning model;
dynamically selecting one of the plurality of third machine learning models, based on an evaluation of the first dataset, the one or more third datasets, and the sets of features;
after the first machine learning model has been deployed to perform the task, generating, using the selected one of the plurality of third machine learning models, at least one value predicting the one or more uncertainties of the at least one metric predicting the performance of the first machine learning model at performing the task on the first dataset; and
providing an indication of the at least one metric and the at least one value.

21. The computer-readable storage medium of claim 20, wherein at least one feature of at least one of the plurality of third machine learning models is generated based at least in part on a first statistical distribution of a first dataset in the one or more third datasets and a second statistical distribution of a second dataset in the one or more third datasets.

22. The computer-implemented method of claim 1, wherein the task comprises a visual task comprising at least one of objection detection or facial recognition.

23. The computer-implemented method of claim 1, wherein the at least one value predicting the one or more uncertainties comprises (i) a first value predicting a first type of uncertainty of the at least one metric predicting the performance of the first machine learning model at performing the task on the first dataset and (ii) a second value predicting a second type of uncertainty of the at least one metric predicting the performance of the first machine learning model at performing the task on the first dataset.

24. The computer-implemented method of claim 23, wherein the first type of uncertainty is associated with the first dataset and wherein the second type of uncertainty is associated with the first machine learning model.

25. The computer-implemented method of claim 1, wherein the first machine learning model configured to perform the task is (i) updated based on the indication or (ii) replaced with a fourth machine learning model configured to perform the task based on the indication.

\* \* \* \* \*